(12) United States Patent
Chene

(10) Patent No.: US 12,481,176 B2
(45) Date of Patent: Nov. 25, 2025

(54) FLUIDIC OPTICAL ARTICLE WITH A MOBILE ELEMENT AND METHOD FOR CONTROLLING SAME

(71) Applicant: Essilor International, Charenton-le-Pont (FR)

(72) Inventor: Sylvain Chene, Charenton le Pont (FR)

(73) Assignee: Essilor International, Charenton-le-Pont (FR)

( * ) Notice: Subject to any disclaimer, the term of this patent is extended or adjusted under 35 U.S.C. 154(b) by 481 days.

(21) Appl. No.: 17/998,285

(22) PCT Filed: May 5, 2021

(86) PCT No.: PCT/EP2021/061840
§ 371 (c)(1),
(2) Date: Nov. 9, 2022

(87) PCT Pub. No.: WO2021/228650
PCT Pub. Date: Nov. 18, 2021

(65) Prior Publication Data
US 2023/0213786 A1 Jul. 6, 2023

(30) Foreign Application Priority Data

May 13, 2020 (EP) ..................................... 20305493

(51) Int. Cl.
*G02C 7/08* (2006.01)
(52) U.S. Cl.
CPC ..................................... *G02C 7/085* (2013.01)
(58) Field of Classification Search
CPC .................................................... G02C 7/085
See application file for complete search history.

(56) References Cited

U.S. PATENT DOCUMENTS

| 5,138,494 A | 8/1992 | Kurtin |
| 6,715,876 B2 | 4/2004 | Floyd |

(Continued)

FOREIGN PATENT DOCUMENTS

| JP | 5-506944 A | 10/1993 |
| JP | 2007-531912 A | 11/2007 |

(Continued)

OTHER PUBLICATIONS

Japanese Office Action issued Oct. 28, 2024 in Japanese Patent Application No. 2022-568914 (with English Translation), 15 pages.

(Continued)

*Primary Examiner* — Tuyen Tra
(74) *Attorney, Agent, or Firm* — Oblon, McClelland, Maier & Neustadt, L.L.P.

(57) ABSTRACT

The disclosure relates to an optical article comprising an optical lens shell having an internal surface, a support element mounting said shell, disposed in a fixed position, and movably mounting a moveable element between a first position and a second position. The optical article further comprises a sealed cavity, placed between the moveable element and the internal surface of the shell. The optical article is switchable between a first configuration, in which the moveable element is passively held against the shell and a second configuration, in which the cavity is filled with a predetermined amount of a fluid altering the propagation of visible light and the moveable element is released from the shell by the pressure exerted by the fluid in the cavity. The disclosure also comprises a corresponding method for controlling said optical article.

18 Claims, 4 Drawing Sheets

(56) References Cited

U.S. PATENT DOCUMENTS

| | | |
|---|---|---|
| 2005/0213220 A1 | 9/2005 | Meyer |
| 2007/0201138 A1 | 8/2007 | Lo |
| 2009/0195882 A1 | 8/2009 | Bolle et al. |
| 2010/0039709 A1* | 2/2010 | Lo .................. G02B 13/009 359/665 |
| 2011/0235186 A1 | 9/2011 | Blum et al. |
| 2012/0019773 A1 | 1/2012 | Blum et al. |
| 2012/0092775 A1 | 4/2012 | Duston et al. |
| 2022/0334393 A1* | 10/2022 | Jamali .................. G02B 26/004 |

FOREIGN PATENT DOCUMENTS

| | | |
|---|---|---|
| JP | 2008-544318 A | 12/2008 |
| WO | WO 91/17463 A1 | 11/1991 |
| WO | WO 03/083556 A2 | 10/2003 |
| WO | WO 2006/011937 A2 | 2/2006 |
| WO | WO 2006/135960 A1 | 12/2006 |
| WO | WO 2013/046934 A1 | 4/2013 |

OTHER PUBLICATIONS

International Search Report & Written Opinion issued Jun. 30, 2021 in PCT/EP2021/061840, filed on May 5, 2021, 11 pages.

* cited by examiner

FIG. 4
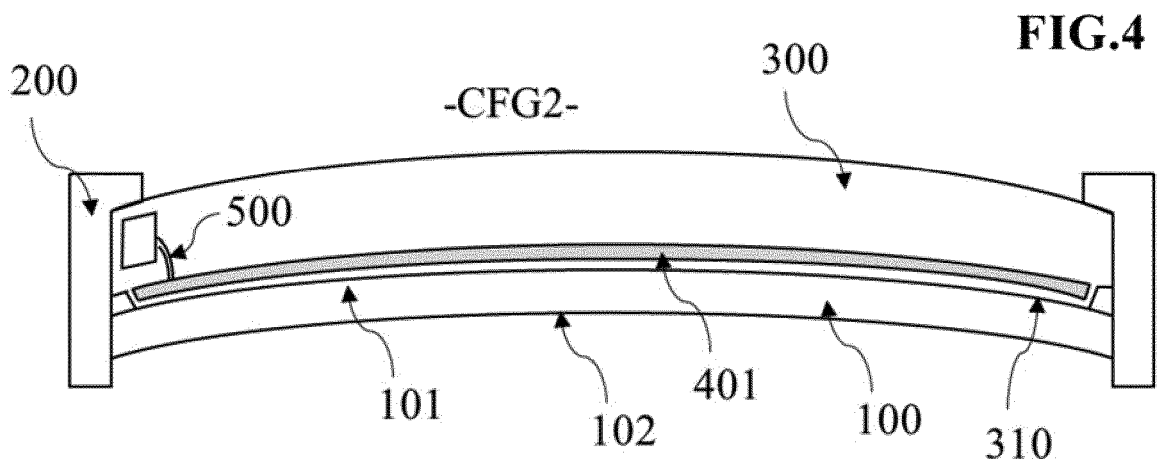
FIG. 4
FIG. 5
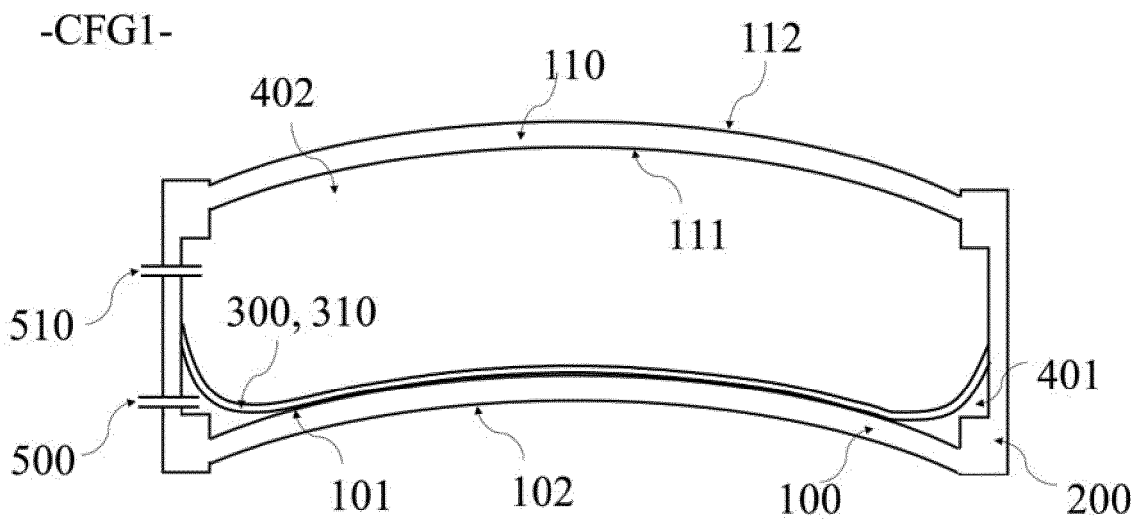
FIG. 5

FIG. 6
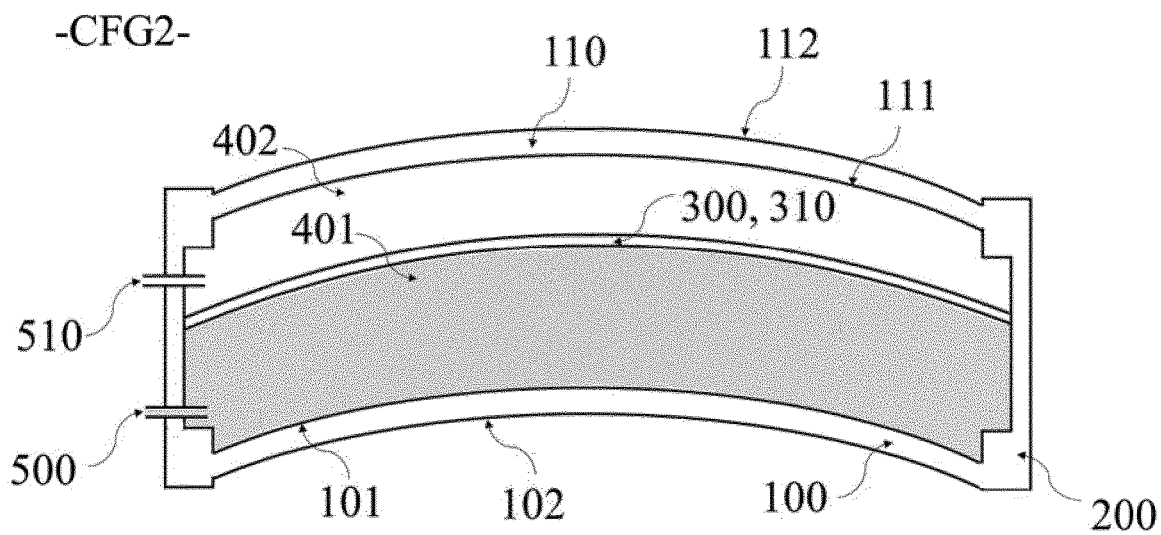
FIG. 6
FIG. 7
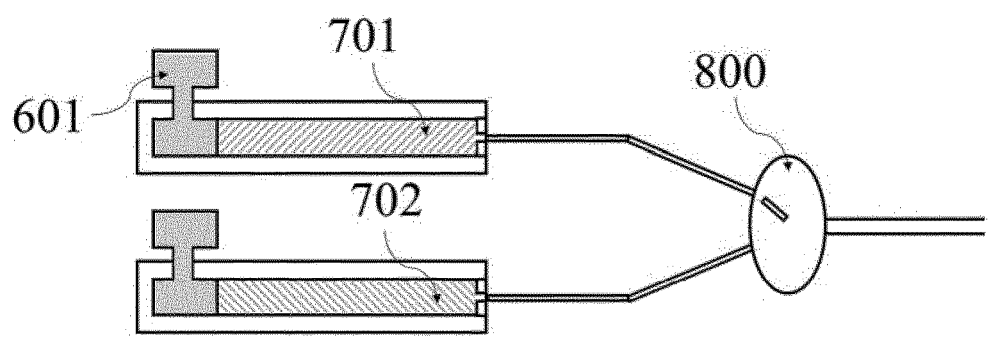
FIG. 7

-CFG2-

FLUIDIC OPTICAL ARTICLE WITH A MOBILE ELEMENT AND METHOD FOR CONTROLLING SAME

FIELD OF THE INVENTION

The present invention relates in general to optical articles such as eyewear or eyewear components and to methods for controlling such optical articles.

BACKGROUND OF THE INVENTION

A concern in the field of optics is to be able to provide an optical lens having a variable, controllable, light transmission function.

Indeed, nowadays most users having prescription glasses also have a pair of solar eyeglasses, and use both alternately depending on the level of ambient light.

It is desirable to remove the need for two pairs of eyeglasses and instead use a single pair of eyeglasses for all situations.

There are known solutions to this concern, most of them being based on using liquid crystals. Some suitable liquid crystals may include electrochromic materials. The transmission of an optical element made out of one such material is controllable by arranging the optical element between two electrodes and by adjusting a difference of potential between the two electrodes.

Therefore, with such an optical equipment, a user does not need to change his prescription glasses for solar glasses, but instead may simply switch the liquid crystals from a clear state to a dark state.

A known drawback of electrochromic dyes, though, is the limited speed of darkening and brightening, in particular at low ambient temperatures.

In parallel, very few known solutions disclose using fluidic lenses, defined as lenses using a liquid flow to vary the transmission of the lens.

The known fluidic lenses involve adding or removing fluid from a cavity delimited by a spherical membrane. The spherical shape of the membrane is required to avoid inducing unwanted astigmatism.

The cavity may for example be filled with photochromic dyes and controlling the fluidic lens may involve plunging the photochromic dyes in a liquid to switch their transmission function from a first state to a second state, and removing the liquid to switch their transmission function from the second state back to the first state.

The variation speed of the transmission function of photochromic dyes in fluidic lenses is much quicker than that of electrochromic dyes.

However, manufacturing and controlling known fluidic lenses is complex due to requiring precise control and precise manipulation of fluids that are geometrically constrained to a small scale. Repeatedly switching a known fluidic lens between a clear state and a dark state may generate unwanted remaining liquid in the cavity in the clear state or unwanted remaining bubbles in the cavity in the dark state, both being prejudicial to the optical quality of the lens.

Another drawback of the known fluidic lenses is related to the spherical shape of the membrane. Indeed, a spherical membrane is attached along a closed line having a round shape, thus a fluidic lens is usually mounted on a round frame. Other frame shapes are still possible, but at the cost of hiding part of the fluidic lens inside the frame.

In this context, there is a need for an optical article which would be quickly switchable between two states, such as a clear state and a darker state, while providing a uniform transmission function over most of the lens area in at least one of the two states, for instance in the clear state, with a very good optical quality.

Optionally, the optical article shall allow providing, in a darker state, a uniform transmission function.

Optionally, the optical article shall allow providing a controllable dioptric function.

Optionally, the optical article shall allow providing a combination of a controllable dioptric function and of a controllable transmission function. For example, for a night drive use, it is desirable to provide a slight optical power increase compared to normal use, combined with a specific yellow tint.

Optionally, the optical article shall not be restricted to any specific frame shape.

Optionally, the optical article shall, possibly, allow changing the optical function on demand to provide a desired tint, color, transmission, optical power, etc.

Optionally, the optical article shall keep providing a very good optical quality after having switched states multiple times.

SUMMARY OF THE INVENTION

The invention is defined by the appended independent claims. Additional features and advantages of the concepts herein disclosed are set forth in the description which follows.

The present disclosure aims at improving the situation.

To this end, the present disclosure describes an optical article comprising an optical lens shell having an internal surface and an external surface, wherein:

the optical article further comprises a support element mounting the optical lens shell, disposed in a fixed position, and movably mounting a moveable element between a first position and a second position, wherein in the first position the moveable element is against the optical lens shell, wherein in the second position the moveable element is released from the optical lens shell, the optical article further comprises a first sealed cavity, placed between the moveable element and the internal surface of the optical lens shell, coupled to a fluid inlet adapted for adjusting an amount of fluid in the first sealed cavity, the optical article is switchable between a first configuration and a second configuration, in the first configuration, the moveable element is passively held in the first position, and in the second configuration, the first sealed cavity is filled with a predetermined amount of a first fluid altering the propagation of visible light and the moveable element is held in the second position by the pressure exerted by the first fluid in the first sealed cavity.

By optical article is understood for example an optical lens such as a spectacle lens, or an optical equipment comprising such optical lens, for instance a pair of eyeglasses comprising a spectacle frame mounting two spectacle lenses. The optical lens may be plano or be an ophthalmic lens. An optical lens has a front surface and a rear surface. When the optical lens is placed in front of an eye of a user, for instance when the optical equipment is worn by the user, the front surface faces a scene while the rear surface faces the eye of the user.

By optical lens shell is understood an element of an optical lens which is made out of a rigid optical material such as organic glass or mineral glass, and which extends radially at least over a central portion of the optical lens, up to a full visual field. The external surface of the optical lens shell coincides for example with the front surface or with the rear surface of the optical lens. The internal surface of the optical lens shell opposes the external surface.

By support element may be understood a peripheral portion of an optical lens, such as a projection extending from the optical lens shell, or from the moveable element, along its periphery.

The expressions "fixed position", "first position" and "second position" have a relative meaning. In other words, these expressions are merely defined with respect to each other. The optical lens shell being mounted in a fixed position corresponds to said fixed position defining the origin of a reference frame. The moveable element is moveable in said reference frame between the first position and the second position, which are both fixed positions in said reference frame.

By support element may be understood a frame element having a first contact portion configured to cooperate with a corresponding portion of the optical lens shell and a second contact portion configured to cooperate with a corresponding portion of the moveable element.

The moveable element being against the optical lens shell means that at least a portion of the moveable element contacts is in contact with at least part of the optical lens shell, for instance with the internal surface of the optical lens shell. Conversely, the moveable element being released from the optical lens shell means that the moveable element is not in contact with the optical lens shell.

It is thus possible, due to the specific arrangement of the features above, and more particularly due to the moveable element, to selectively provide to a user a first optical function in the first configuration and a second optical function in the second configuration.

For example, as a result, the first configuration may correspond to a clear state and the second configuration to a dark state, and switching from the first configuration to the second configuration is quicker than switching an electrochromic material from a clear state to a dark state.

Moreover, compared to known fluidic lenses, the optical article is less prone to generating unwanted remaining liquid in the cavity in the first configuration or unwanted remaining bubbles in the cavity in the second configuration. This is due to the specific arrangement of features above, more particularly due to the first cavity being sealed and its volume being controllable, induced by the displacement or the deformation of the moveable element between the first and second configurations. For example, the first position may correspond to the moveable element being held against the internal surface of the optical lens shell. A very good optical quality is thus obtained at least in the first configuration. Moreover, the optical article still provides a very good optical quality after having switched multiple times back and forth between both configurations.

Due to the specific arrangement of features above, it is easy to shape the moveable element and the optical lens shell to provide at least a uniform transmission function, and possibly a uniform dioptric function, in at least one of the two configurations.

For example, if the moveable element and the optical lens shell are both rigid elements having spherical surfaces and a uniform thickness, then the first sealed cavity also has a uniform thickness in both configurations, thus uniform transmission functions are provided in both configurations.

For example, if the moveable element and the optical lens shell are both rigid elements, comprise surfaces that cooperate with each other and are tightly held against each other in the first configuration, then a uniform optical function is provided in the first configuration.

For example, if the moveable element is deformable, it may be deformed so as to be tightly held against the internal surface of the optical lens shell in the first configuration, then a uniform optical function is provided in the first configuration.

For example, if the moveable element is deformable and the optical article is configured so that the moveable element is deformed in the second configuration to have the same shape as the internal surface of the optical lens shell, then a uniform transmission function is provided in the second configuration.

In an example, the moveable element is a rigid element having an external surface and an internal surface.

Such a moveable element is non-deformable and the optical article is switched between both configurations by translating such moveable element along a straight path between the first position and the second position. A user may exert pressure on such a moveable element to displace the moveable element from the second position to the first position, thus switching the optical article from the second configuration to the first configuration.

In an example, the first sealed cavity is defined by the internal surface of the rigid element and the internal surface of the optical lens shell.

The optical functions provided by such an optical article in the first configuration and in the second configuration may be customized simply by manufacturing the moveable element to have a desired shape, while all the other elements of the optical article may be generic. For example, the optical lens shell may simply have a spherical internal surface and a uniform thickness.

In an example, the optical equipment comprises, attached on the internal surface of the rigid element, a deformable membrane which is held against the internal surface of the optical lens shell in the first and second configurations, and the first sealed cavity being defined by the deformable membrane and the internal surface of the rigid element.

Since the first cavity is defined by the moveable element and the deformable membrane attached to said moveable element, the sealing of the first sealed cavity is guaranteed by the binding of the membrane to the moveable element. An advantage is that manufacturing the optical article is facilitated. Indeed, mounting the moveable element onto the support element does not require precise manipulations, air can be allowed to flow between the outside of the optical article and the area between the optical lens shell and the membrane, yet any risk of a fluid leak during use of the optical article is prevented.

In an example, the moveable element is a deformable membrane, the first sealed cavity being defined by the deformable membrane and the internal surface of the optical lens shell.

Such a moveable element being deformable, the optical article is switched between both configurations by deforming such moveable element between the first position and the second position. In other words, at least part of the membrane is moved between the first position in the first configuration and the second position in the second configuration.

The deformable membrane may for example be attached, on its edge, to the support element. The binding of the deformable membrane with the support element is performed so as to ensure the sealing of the first sealed cavity.

In this case, in the first configuration, the membrane passively rests against the internal surface of the optical lens shell, whereas in the second configuration, due to the fluid filling the first sealed cavity and increasing its volume, the membrane is released from the optical lens shell and is deformed, its surface being extended. In this case, the shape of the deformable membrane in the second configuration depends on the shape of the support element and on optional further constraints.

For example, the optical article may comprise a rigid element having an internal surface and an external surface, mounted on the support element, disposed in a fixed position.

The internal surface of the rigid element may be arranged to enter in contact with the external surface of the deformable membrane in the second configuration. The shape of the membrane in the second configuration thus coincides with the shape of the internal surface of the rigid element. This shape may be custom in order to provide a desired optical function at least in the second configuration.

If no such rigid element is present and the deformable membrane is not affected by any further constraints, then the shape of the deformable membrane in the second configuration only depends on the shape of the support element. For example, if the support element is a round spectacle frame, then the membrane has a spherical shape in the second configuration.

In an example, a second sealed cavity is defined by the membrane and the internal surface of the rigid element, at least in the second configuration, the second sealed cavity is filled with a predetermined amount of a counter-pressuring fluid, exerting on the membrane a counter-pressure which opposes the pressure exerted by the first fluid in the first sealed cavity, and the membrane has a non-uniform thickness.

In this example, the membrane does not contact the rigid element.

In the second configuration, the shape of the membrane may be predetermined based on setting a predetermined pressure difference between the first fluid and the second fluid. This allows providing a predetermined optical power in the second configuration. Said predetermined optical power may be set up while initializing the optical article, and may be customized for a specific need of a user, such as for a specific type of visual activity.

The deformable membrane may be made of a material filtering at least part of the visible light spectrum. In this case, due to its non-uniform thickness, the transmission function of the deformable membrane is non-uniform. Moreover, due to the non-uniform thickness of the deformable membrane, the width of the first sealed cavity is also non uniform. Therefore, if the first fluid filters at least part of the visible light spectrum, then the transmission function of the first sealed cavity is non-uniform. The same applies to the second cavity and the counter-pressuring fluid. Therefore, it is possible to provide a non-uniform transmission function, for example for aesthetical purposes or to adapt to differences in sensitivity of the eye of a user to light intensity across the visual field.

Moreover, due to the non-uniform thickness of the deformable membrane, the diopter formed of the membrane and of the first fluid does not have a uniform curvature, but instead comprises hollows and bumps, which may be chosen so as to provide local optical power deviations. As a result, the optical design of the optical lens may be predetermined, for example according to a prescription of a user, simply by customizing the thickness of the deformable membrane across the visual field.

In the first configuration, the counter-pressuring fluid filling the second sealed cavity may further be used to help pushing the deformable membrane against the internal surface of the optical lens shell, thus ensuring the first sealed cavity is empty of the first fluid and guaranteeing an optimal optical quality.

As already mentioned, the optical function provided by the optical article in the second configuration depends on the optical properties of the optical lens shell, of the moveable element, of the first fluid and, if applicable, of the counter-pressuring fluid.

In the following three examples, it is assumed that the optical article comprises a rigid element defining, with the optical lens shell, a hollow chamber, that the optical article further comprises a deformable membrane as a moveable element separating the hollow chamber in a first sealed cavity and a second sealed cavity and that the membrane has a non-uniform thickness.

In the second configuration, the first sealed cavity is filled with a predetermined amount of a first fluid and the second sealed cavity is filled with a predetermined amount of a counter-pressuring fluid.

In the first configuration, the first sealed cavity is either filled with a lesser amount of the first fluid than the predetermined amount above or empty of the first fluid, and the second sealed cavity comprises at least the predetermined amount of the counter-pressuring fluid.

In these three examples, the difference between the optical functions respectively provided by the optical article in the first and second configurations is only function of the nature and optical properties of the first fluid and of the counter-pressuring fluid.

In an example, one of the first fluid, the counter-pressuring fluid and the membrane filters at least part of the visible light spectrum so that in the second configuration, the optical article has a non-uniform transmission function.

In an example, one of the first fluid, the counter-pressuring fluid and the membrane is tinted so that in the second configuration, the optical article has a non-uniform tint.

In an example, the first fluid and the counter-pressuring fluid have substantially different refractive indices so that in the second configuration, the optical article has a non-uniform dioptric function.

In an example, the fluid inlet is coupled to a controllable element for switching the optical article from the first configuration to the second configuration by moving a predetermined amount of the first fluid from a first fluid tank to the first sealed cavity and/or from the second configuration to the first configuration by moving the predetermined amount of the first fluid from the first sealed cavity to the first fluid tank.

The controllable element may be embedded for example in a frame element of the optical article. The optical article may comprise a plurality of such controllable element. The same controllable element may be used both for switching the optical article from the first configuration to the second configuration and vice versa, or different controllable elements may be used for switching the optical article from the first configuration to the second configuration and for switching the optical article from the second configuration to the first configuration.

Examples of controllable elements may include a button, a slider, a motor coupled to an electrical power source, that is switchable using for example a piezoelectric element, etc.

US2012087014 discloses an example of a possible pump which may be used here as a controllable element for injecting a fluid in a cavity or removing fluid from a cavity. Other pumps may be applicable of course.

The optical lens shell, deformable element and rigid element defined above may each be an example of a controllable element. Indeed, exerting pressure on an element defining the first sealed cavity induces decreasing the volume of the first sealed cavity and moving the moveable element from the second position to the first position. In the first configuration, exerting pressure on a deformable element containing the first fluid and coupled to the first sealed cavity induces decreasing the volume of said deformable element, pushing fluid into the first sealed cavity and moving the moveable element from the first position to the second position.

In an example, the optical article is switchable between the first configuration and a third configuration, wherein:
in the third configuration, the first sealed cavity is filled with a predetermined amount of a second fluid, and the moveable element is held in the second position by the pressure exerted by the second fluid in the first sealed cavity, and
the second fluid alters the propagation of visible light differently than the first fluid.

Indeed, the optical article is not limited to only two configurations but, by replacing the first fluid with another fluid having different optical properties, in particular having a different absorption spectrum, it is possible for the optical article to switch to additional configurations, each providing an additional optical function.

In an example, the optical article further comprises a selector configured to selectively couple the fluid inlet with a first fluid tank containing the predetermined amount of the first fluid or with a second fluid tank containing the predetermined amount of the second fluid.

For example, the first fluid and the second fluid may have different tints and the user may switch the tint of the optical article on demand.

The present disclosure also describes a method for controlling an optical article comprising:
an optical lens shell having an internal surface and an external surface,
a support element mounting the optical lens shell, disposed in a fixed position, and movably mounting a moveable element between a first position and a second position, wherein in the first position the moveable element is against the optical lens shell, wherein in the second position the moveable element is released from the optical lens shell,
a first sealed cavity, placed between the moveable element and the internal surface of the optical lens shell, coupled to a fluid inlet adapted for adjusting an amount of fluid in the first sealed cavity,
the method comprising switching the optical article between a first configuration and a second configuration,
in the first configuration, the moveable element being passively held in the first position, and
in the second configuration, the first sealed cavity being filled with a predetermined amount of a first fluid altering the propagation of visible light and the moveable element is held in the second position by the pressure exerted by the first fluid in the first sealed cavity.

In an example, the optical article further comprises a selector configured to selectively couple the fluid inlet with a first fluid tank containing the predetermined amount of the first fluid or with a second fluid tank containing a predetermined amount of a second fluid which alters the propagation of visible light differently than the first fluid,
the method comprises switching the optical article between the first configuration and a third configuration,
in the third configuration, the first sealed cavity is filled with the predetermined amount of the second fluid, and the moveable element is held in the second position by the pressure exerted by the second fluid in the first sealed cavity.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

FIG. 4 depicts the exemplary optical equipment depicted in FIG. 3, placed in a second configuration.

FIG. 5 depicts an example of an optical equipment, comprising as a mobile element a soft membrane, placed in a first configuration.

FIG. 6 depicts the exemplary optical equipment depicted in FIG. 5, placed in a second configuration.

FIG. 7 depicts an example of a fluid supply element coupled to a fluid inlet of an exemplary optical equipment placed in a first configuration.

DETAILED DESCRIPTION OF THE INVENTION

Figure 1:
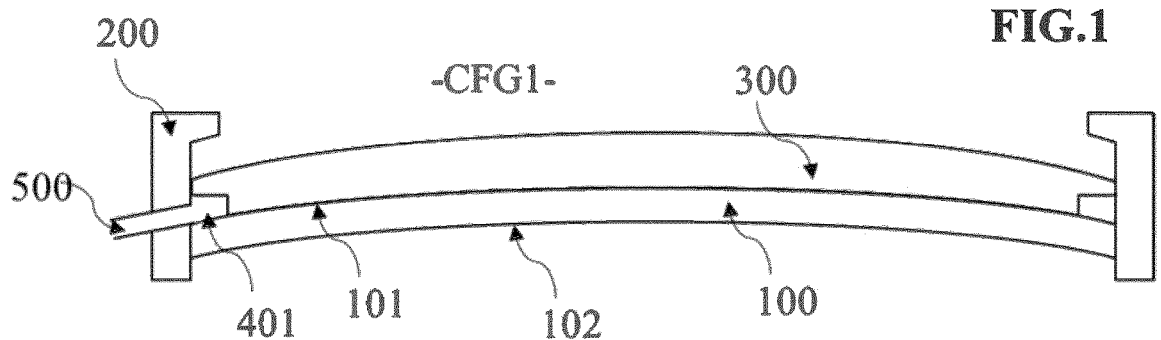
FIG. 1 depicts an example of an optical equipment, comprising a hard shell as a mobile element, placed in a first configuration.

In the description which follows the drawing figures are not necessarily to scale. In particular, the relative dimensions of cavities with respect to rigid elements may be exaggerated. Certain features may be shown in generalized or schematic form in the interest of clarity and conciseness or for informational purposes. In addition, although making and using various embodiments are discussed in detail below, it should be appreciated that as described herein are provided many inventive concepts that may be embodied in a wide variety of contexts. Embodiments discussed herein are merely representative and do not limit the scope of the invention. It will also be obvious to one skilled in the art that all the technical features that are defined relative to a process can be transposed, individually or in combination, to a system and conversely, all the technical features relative to a system can be transposed, individually or in combination, to a process.

It is now referred to FIG. 1, which depicts an exemplary optical equipment which comprises at least an optical lens and a support element (200). The optical equipment may be, for example, a pair of spectacle lenses mounted on a spectacle frame.

The optical lens comprises at least an optical lens shell (100) and a moveable element (300).

In this example, the optical lens shell (100) and the moveable element (300) are each made out of a rigid optical material. Examples of suitable materials include mineral glass materials and organic glass materials. The refractive indices of each said material may be chosen to be close to each other, for example having a difference of 0.10 or less, for example 0.05 or less, for example 0.02 or less.

The optical lens shell (100) is in a fixed position with respect to the support element (200).

For example, the optical lens shell (100) and the support element (200) may be separate elements configured to cooperate with each other so that the optical lens shell (100) is mounted in said fixed position with respect to the support element (200). Alternately, the optical lens shell (100) and the support element (200) may be defined as different parts of a single, monolithic, and rigid element.

The optical lens shell (100) comprises an internal surface (101) and an external surface (102) opposite to the internal surface (101) of the optical lens shell (100). The shapes of each of these surfaces may be chosen based on a prescription of a user to contribute in providing a desired dioptric function to said user.

The moveable element (300) also comprises an internal surface and an external surface opposite to the internal surface of the moveable element. The shape of each of these surfaces may be chosen based on a prescription of a user to contribute in providing a desired dioptric function to said user. For the purpose of optimizing mechanical properties of the moveable element (300), its internal and external surfaces of the moveable element may be uniformly spaced, in other words the moveable element (300) may have a uniform thickness.

The moveable element (300) is movably mounted on the support element (200) between a first position and a second position. In the first position, the moveable element (300) is against the optical lens shell (100). In the second position, the moveable element (300) is released from the optical lens shell (100). For each of the first and second positions, the support element (200) may comprise abutments arranged to cooperate with corresponding portions of the moveable element (300).

In both the first and the second positions, the internal surface of the moveable element (300) faces the internal surface (101) of the optical lens shell (100). A first sealed cavity (401) is delimited by the internal surface of the moveable element (300) and by the internal surface (101) of the optical lens shell (100).

The internal surfaces of the moveable element (300) and of the optical lens shell (100) may be conformed to each other to minimize the volume of the first sealed cavity (401), in particular when the moveable element (300) is held against the optical lens shell (100), thus minimizing accordingly the thickness of the optical lens.

The support element (200) comprises a fluid inlet (500) as a channel coupled with the first sealed cavity (401) and with a fluid tank. The fluid inlet (500) is configured to allow a bidirectional fluid transfer between the first sealed cavity (401) and the fluid tank. The fluid tank may for example be embedded in the support element (200), for example placed in the arm of the spectacle frame on which the optical lens is mounted. The fluid tank may be attached, such as removably attached, to the support element (200).

The fluid inlet (500) and/or the fluid tank may alternately be embedded in a peripheral area of the optical lens shell or of the moveable element.

In FIG. 1, the optical equipment is depicted placed in a first configuration (CFG1), in which the moveable element (300) is passively held in the first position, against the optical lens shell (100).

Various structural elements that are well known to the person of ordinary skill in the art may be used to passively hold the moveable element (300) in the first position.

For example, the optical equipment may further comprise a spring, a block in an elastic material or any other similar element arranged to exert a return force on the moveable element (300). The return force opposes the force exerted by the fluid filling the first cavity (401). In this example, the optical equipment is placed in the first configuration by setting the pressure in the first cavity (401) below a predetermined threshold. For example, the first cavity (401) may be filled with less than a predetermined amount of fluid, chosen so that the return force is sufficient to passively hold the moveable element (300) in the first position.

For example, the optical equipment may be configured so that the moveable element (300) is arranged between the first cavity (401), on the side of the internal surface of the moveable element (300), and a zone under ambient pressure, on the side of the external surface of the moveable element (300). In this example, the position of the moveable element (300) is also controllable by adjusting the pressure in the first cavity (401). The optical equipment may be placed in the first configuration simply by placing the first cavity (401) under at least partial vacuum, in which case the ambient pressure maintains the moveable element (300) against the optical lens shell (100).

Figure 2:
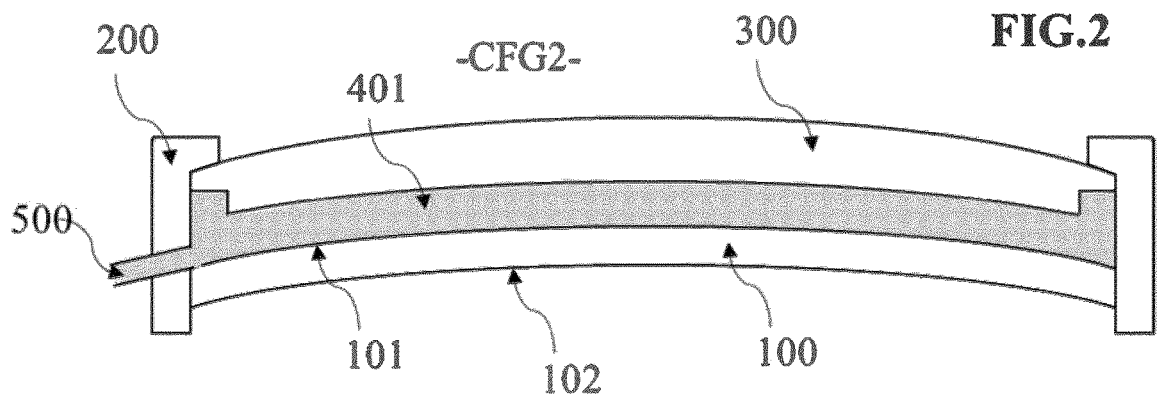
FIG. 2 depicts the exemplary optical equipment depicted in FIG. 1, placed in a second configuration.

It is now referred to FIG. 2, which depicts the same exemplary optical equipment as FIG. 1, here placed in a second configuration (CFG2).

In the second configuration (CFG2), the first sealed cavity (401) is filled with a predetermined amount of a first fluid altering the propagation of visible light. In other words, in the second configuration (CFG2), the optical function of the optical equipment is affected by the presence of the first fluid in the first sealed cavity (401).

For example, the first fluid may be tinted, so that the transmission function of the optical lens is noticeably affected.

For example, the refractive index of the first fluid may be chosen slightly different from the refractive index of the moveable element (300) and/or of the optical lens shell (100). For example, said difference may be chosen to be 0.02 or more, for example 0.05 or more, so that the dioptric function of the optical lens is noticeably affected.

When the optical equipment is placed in the second configuration (CFG2), the pressure exerted by the first fluid in the first sealed cavity (401) exceeds the pressure in the first sealed cavity when the optical equipment is placed in the first configuration (CFG1). As a result, the volume of the first sealed cavity (401) is expanded and the moveable element (300) is held in the second position, released from the optical lens shell (100).

The distance between the first position and the second position may be for example about 20 µm. Indeed, about a 20 µm thickness of a solar solution, a tinted solution or a photochromic solution is sufficient to absorb light so as to avoid glare and allow a user to comfortably view a scene under sunshine conditions. For the first sealed cavity (401) to have such thickness in the second configuration (CFG2), its volume may be calculated based on the shape and size of the lens. For example, if the optical lens is round and has a diameter of 70 mm, the volume of the first cavity (401) in the second configuration (CFG2) is equal to about 0.07 mL.

For example, if the optical lens is round and has a diameter of 35 mm, the volume of the first cavity (401) in the second configuration (CFG2) is equal to about 0.02 mL. The volume calculated as such is also the required minimal volume of the fluid tank or the fluid cartridge so that said tank or cartridge may be filled with the first fluid in the first configuration (CFG1).

The optical equipment is reversibly switchable between the first configuration (CFG1) and the second configuration (CFG2) by controlling the amount of the first fluid allowed to fill the first sealed cavity (401).

If said amount corresponds to a fluid pressure below a predetermined threshold, the optical equipment is in the first configuration (CFG1). If said amount exceeds said predetermined threshold, the optical equipment is in the second configuration (CFG2).

For example, in the first configuration (CFG1), an amount of the first fluid at least equal to a predetermined value may be contained in a fluid tank coupled to the fluid inlet (500), itself coupled to the first fluid cavity (401) which is empty of the first fluid. The optical equipment may be switched to the second configuration (CFG2) by moving an amount of the first fluid equal to said predetermined value from the fluid tank through the fluid inlet (500) and to the first fluid cavity (401). The optical equipment may then be switched back to the first configuration (CFG1) by moving said amount of the first fluid equal to said predetermined value from the first fluid cavity (401) through the fluid inlet (500) and back to the fluid tank.

The radius of the internal surface of the optical lens shell (100) may be slightly inferior than the radius of the internal surface of the moveable element (300) may be slightly different. This allows facilitating the extraction of the fluid in the first sealed cavity (401) when switching the optical article from the second configuration (CFG2) to the first configuration (CFG1).

The optical article may comprise different types of controllable elements for switching between the first and the second configurations (CFG1, CFG2). Indeed, the command can be manual, such as by pressing a button or displacing a slider, or electronic. Switching may be restricted to a binary choice between the first and the second configurations (CFG1, CFG2). Alternately, the optical article may allow switching, in a discrete or continuous manner, to and from one or more intermediate configurations in which the level of the first fluid in the first sealed cavity (401) is greater than in the first configuration (CFG1) but smaller than in the second configuration (CFG2). For example, the fluid inlet (500) may be coupled to a fluid supply system that comprises a controllable element configured so that the wearer can vary the level of the first fluid in the first sealed cavity (401) and then can vary, for example, the level of transmission if the first fluid absorbs part of the visible light spectrum.

Figure 3:
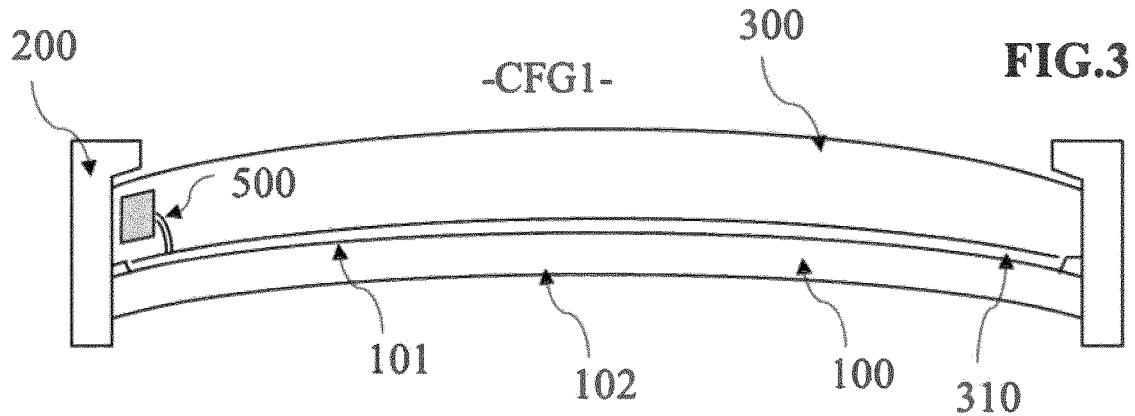
FIG. 3 depicts an example of an optical equipment, comprising as a mobile element a hard shell containing a soft membrane, placed in a first configuration.
Figure 8:
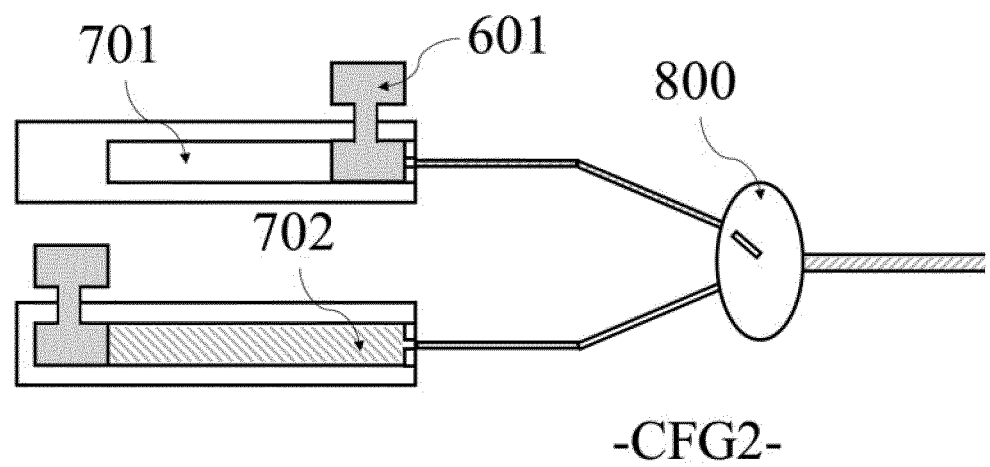
FIG. 8 depicts the exemplary fluid supply element depicted in FIG. 7, the optical equipment being placed in a second configuration.

It is now referred to FIG. 3, which depicts another exemplary optical equipment which differs from that depicted on FIG. 1 in that the optical equipment comprises, attached to the internal surface of the moveable, rigid, element (300), a deformable membrane (310). For example, the deformable membrane (310) is a transparent and flexible film.

In this example, the optical equipment is adapted to bag a fluid in a first sealed cavity (401) which is defined by the internal surface of the moveable element (300) and by the deformable membrane (310).

In this example, the fluid inlet (500) coupled to the internal cavity (401) is a channel crossing not only the support element (200) but also the moveable element (300).

This arrangement thus differs from that of the exemplary optical equipment depicted on FIG. 1, which does not comprise such deformable membrane, where the first sealed cavity (401) is defined by the internal surface of the moveable element (300) and by the optical lens shell (101), and where the fluid inlet (500) does not need to comprise a channel portion crossing through the moveable element (300).

Another possible arrangement of the fluid inlet (500) is a channel fully embedded in the moveable element (300) and coupling the internal cavity (401) with a fluid tank, such as a grove or a bubble, which may also be embedded in a peripheral portion of the moveable element (300). The volume of the fluid tank is predetermined to allow being filled with the predetermined amount of the first fluid.

The means to maintain a suitable pressure in the first sealed cavity and in the fluid tank are not described here but various options are known from the person of ordinary skilled in the art and/or may be derived for example from the field of ballpoint pens where the issue of maintaining a suitable pressure in a microfluidic system is also faced.

The surfaces in contact with the first fluid may be hydrophobic in order to facilitate the removing of said fluid when switching the optical article between different configurations. This applies to fluid tanks, rigid elements, deformable membranes, support element, fluid inlets, optical lens shells, etc.

It may be relevant to increase the wettability of the surfaces in contact with the first fluid so that the surface energy of these surfaces is higher than the surface energy of the first fluid, to ensure absence of drops and bubbles when the fluid is removed. Oxygen Plasma activation techniques may be used for that purpose. Another possibility is to include a surfactant in the composition of the fluid.

In the example of FIG. 3, the optical equipment is depicted placed in a first configuration (CFG1), where the moveable element (300) is passively held against the optical lens shell (100).

The respective shapes of the moveable element (300), of the support element (200) and of the optical lens shell (100) may be chosen so that in the first configuration the internal surfaces of the moveable element (300) and of the optical lens shell (100) cooperate with each other and tightly clamp the deformable membrane (310). For example, the membrane may be made out of tinted material. In this configuration, the thickness being uniform, the thickness of the tinted material is uniform over the lens surface, and so tint is uniform.

The membrane may be designed so that whatever the configuration of the optical article, no folds are formed that would degrade optical quality. For this purpose, the thickness of the membrane may be chosen greater than a predetermined threshold, which is a function of the material forming the membrane, to provide sufficient stiffness.

Alternatively, the respective shapes of the moveable element (300), of the support element (200) and of the optical lens shell (100) may be chosen so that in the first configuration (CFG1) a hollow chamber is formed between the internal surfaces of the moveable element (300) and of the optical lens shell (100). The position of the deformable membrane (310) in the hollow chamber in the first configuration (CFG1) may be predetermined. For example, the pressure in the first sealed cavity (401) may be chosen to allow the deformable membrane (310) to rest on the internal surface (101) of the optical lens shell (100). Alternatively, the pressure in the first sealed cavity (401) may be set to a slight vacuum to hold the deformable membrane (310) against the internal surface of the moveable element (300).

It is now referred to FIG. 4, which depicts the same exemplary optical equipment as FIG. 3, here placed in a second configuration (CFG2).

In the second configuration (CFG2), the first sealed cavity (401) is filled with a predetermined amount of the first fluid, similarly as the exemplary optical equipment depicted in FIG. 2.

The volume of the first sealed cavity (401) is greater in the second configuration (CFG2) than in the first configuration (CFG1). In the second configuration, the deformable membrane (310) is released from the internal surface of the moveable element (300) and is supported on the internal surface (101) of the optical lens shell (100). Due to the pressure exerted by the first fluid in the first sealed cavity (401), the moveable element (300) is thus released from the optical lens shell (100).

Controlling the optical article to switch between the first configuration (CFG1) and the second configuration (CFG2) may be performed either manually, such as by exerting a manual pressure on the moveable element (300) or electronically using a piezoelectric controller.

In this example, the deformable membrane may have a uniform or a non-uniform thickness.

A uniform thickness of the membrane (300) allows providing, on a full field, a desired optical function without needing to compensate for intrinsic optical properties, such as transmission properties, of the membrane (300).

A non-uniform thickness of the membrane (300) and/or an aspherical shape of the internal surface of the moveable element (200) may be chosen so that the width of the first sealed cavity (401) is also non uniform. Depending on the optical properties of the first fluid, it is thus possible to provide, in the second configuration (CFG2), for example a non-uniform tint on a full field, or to introduce local optical power deviations.

In general, the shape of the membrane is a parameter which can be predetermined so as to help providing a desired optical function. Indeed, it may be useful for an optical lens manufacturer to manufacture deformable membranes having non uniform thicknesses. Indeed, designing a membrane having a non-uniform thickness allows the optical lens manufacturer to provide an optical equipment having an optical function fine-tuned to fit a specific customer's needs, even if the optical lens shell (100) and the moveable element (300) are generic in their shapes and thicknesses.

It is now referred to FIG. 5, which depicts another exemplary optical equipment which differs from that depicted on FIG. 1 in that the moveable element (300) is a deformable membrane (310) rather than a rigid element.

The membrane (310) is mounted on the support element (200) and is deformable between a first position and a second position.

The membrane (310) has an internal surface which defines, along with the internal surface (101) of the optical lens shell (100), the first sealed cavity (401). The membrane (310) further has an external surface opposite to its internal surface.

The optical equipment may further comprise a rigid element (110) mounted on the support element (200) and disposed in a fixed position with respect to the optical lens shell (100). When the optical equipment comprises such rigid element (110), such rigid element (110) has an internal surface (111) which defines, with the external surface of the membrane (310), a second sealed cavity (402). The rigid element (110) further has an external surface (112) opposite to its internal surface (111).

Moreover, the sum of the volumes of the first cavity (401) and of the second cavity (402) may be fixed as a result of the optical lens shell (100), the rigid element (110) and the support element being all non-deformable. Therefore, any deformation of the membrane (310) involving increasing the volume of the first cavity (401) also decreases the volume of the second cavity (402) and vice versa.

The optical equipment may further comprise another fluid inlet (510) as a channel crossing the support element (200) and coupling the second sealed cavity (402) with the exterior of the optical lens. The exterior of the optical lens may define here for example a valve in the support element (200) to maintain the second sealed cavity under an ambient air pressure. Alternately, the exterior of the optical lens may define a sealed element, such as a fluid tank which may be embedded in the support element (200) or attached, such as removably attached, to the support element (200).

In the example of FIG. 5, the optical equipment is depicted placed in a first configuration (CFG1), where the internal surface of the membrane (310) is passively held against the internal surface (101) of the optical lens shell (100).

It is now referred to FIG. 6, in which the optical equipment depicted on FIG. 5 is placed in a second configuration (CFG2).

The amount of the first fluid filling the first cavity (401) is increased in the second configuration (CFG2) compared to in the first configuration (CFG1). As a result, the membrane (310) is deformed and released from the internal surface (101) of the optical lens shell (100) to allow the volume of the first cavity (401) to expand.

When the optical equipment comprises a second cavity (402), the second sealed cavity (402) may be filled with a predetermined amount of a counter-pressuring fluid, exerting on the membrane (310) a counter-pressure which opposes the pressure exerted by the first fluid in the first sealed cavity (401). Switching the optical equipment from the first configuration (CFG1) to the second configuration (CFG2) is performed by controlling the pressure difference between the first cavity (401) and the second cavity (402), or by controlling the respective amounts of the first fluid in the first cavity (401) and/or of the counter-pressuring fluid in the second cavity (402).

The difference between the respective optical functions that are provided by the optical equipment in the first configuration (CFG1) and in the second configuration (CFG2) is affected by the optical properties of the first fluid and of the counter-pressuring fluid and by the shape of the membrane (310).

For the sake of simplicity, it is assumed in the following examples that in each configuration, only one of the cavities is filled with a fluid.

More precisely, in the first configuration (CFG1) the first cavity (401) is empty of any fluid while the second cavity is filled with the counter-pressuring fluid.

In the second configuration (CFG2) the first cavity (401) is filled with the first fluid while the second cavity is empty of any fluid.

It is further assumed that both the first fluid and the counter-pressuring fluid alter the transmission of visible light, albeit differently. For example, their refractive indices, or their visible light absorption spectra, may be different.

It is further assumed, for the sake of simplicity, that the internal surface (101) of the optical lens shell (100) is spherical, so that:

if the membrane (310) is designed to have a uniform thickness, then in the second configuration (CFG2) the internal surface of the membrane (310) is conformed to the internal surface (101) of the optical lens shell (100) and the width of the first cavity (401) is uniform and, conversely, if the membrane (310) is designed to have a non-uniform thickness, then in the second configuration (CFG2) the internal surface of the membrane (310) comprises projections and recesses that are not conformed to the internal surface (101) of the optical lens shell (100) and the width of the first cavity (401) is non-uniform.

For example, the first fluid, and possibly the counter-pressuring fluid, may be chosen, based on their transmission spectra, to filter at least part of the visible light spectrum. As a result, in the second configuration (CFG2), at least part of the visible light spectrum is filtered by the optical equipment. In addition, the membrane (310) may have a non-uniform thickness, resulting in a non-uniform width of the first cavity (401) containing the first fluid filtering at least part of the visible light spectrum. As a result, in the second configuration (CFG2), the optical equipment has a non-uniform transmission function.

For example, the first fluid, and possibly the counter-pressuring fluid may be tinted. As a result, in the second configuration (CFG2), the optical article is tinted. If the membrane (310) has a non-uniform thickness, then the width of the first cavity (401) is also non uniform and the optical equipment has a non-uniform tint. Moreover, if the refractive indices of the counter-pressuring fluid, of the membrane (310) and of the first fluid are substantially equal, then the dioptric function provided by the optical article in both configurations (CFG1, CFG2) is unchanged even if the membrane (310) has a non-uniform thickness.

For example, the first fluid and the counter-pressuring fluid may have substantially different refractive indices. Substantially different refractive indices in this context are defined as exhibiting a difference of 0.03 or more, possibly 0.06 or more, possibly 0.10 or more. As a result, in the second configuration (CFG2), the optical article has a dioptric function that is different from that in the first configuration (CFG1). In addition, the membrane (310) may have a non-uniform thickness in order to introduce local optical power deviations in the second configuration (CFG2).

To illustrate this last point, let's consider for example that the refractive indices of the first fluid and of the membrane (310) are substantially equal, and that the refractive index of the counter-pressuring fluid is substantially different from them both.

In this example, in the first configuration (CFG1), due to a difference of refractive index between the counter-pressuring fluid and the membrane (310) and due to the non-uniform thickness of the membrane (310) held on the optical lens shell (100), the global optical power provided by the optical article is a function of the shapes of the optical lens shell (100) and of the membrane (310).

In the second configuration (CFG2), due to the refractive indices of the membrane (310) and of the first fluid being substantially equal and due to the second sealed cavity being empty of any counter-pressuring fluid, the global optical power provided by the optical article is only function of the shape of the optical lens shell (100).

More generally, using in the first cavity (401) a first fluid having a refractive index $n_2$ and in the second cavity (402) a counter-pressuring fluid having a refractive index $n_4$ different from $n_2$, combined with using a membrane (310) having a non-uniform thickness and a refractive index $n_3$ allows controlling the provided optical power in the following way:

in the first configuration (CFG1): P (x,y)=$(n_2-n_3)$. C (x,y) and P (x,y)=$(n_2-n_3)$. C (x,y).

in the second configuration (CFG2): P (x,y)=$(n_3-n_4)$. C (x,y) and P (x,y)=$(n_3-n_4)$. C (x,y).

These equations are established for a reference frame comprising a first direction X and a second direction Y perpendicular to the first direction X, with any location at the surface of the optical article being identified by its absciss x and its ordinate y.

P (x,y) designates the optical power provided by the optical article in the first direction X, at a location (x,y). P (x,y) designates the optical power in the second direction Y at the location (x,y). C (x,y)=$d^2E$ (x,y)/$d^2$ and C (x,y)=$d^2E$ (x,y)/$d^2$, with E(x,y) being the thickness of the membrane at the location (x,y).

Of course, by combining a membrane (310) having a non-uniform thickness with a fluid having a tint, it is possible to obtain a change of optical power as well as a change of transmission function between both configurations (CFG1, CFG2).

It is now referred to FIG. 7 which depicts an example of a fluid supply element that may be coupled to a fluid inlet (500) of any of the exemplary optical equipments described above. The fluid supply element may be, for example, embedded in the support element (200).

The fluid supply element comprises at least a first fluid tank (701). In the first configuration (CFG1) of the optical equipment, the first fluid tank is filled with at least the predetermined amount of the first fluid.

The first fluid tank (701) comprises a controllable element (601), such as a piston, for pushing fluid from the fluid tank (701) towards the fluid inlet (500) or to suck fluid from the fluid inlet (500) back to the fluid tank (701).

Another possible arrangement is described thereafter. In this arrangement, the fluid tank (701) and the moveable element (300) themselves may be used as controllable elements (601). The fluid tank (701) may be made out of a deformable material. A user may thus simply exert pressure on the fluid tank (701), diminishing its volume and pushing fluid initially filling the fluid tank towards the fluid inlet (500), thus switching the optical equipment from the first configuration (CFG1) to the second configuration (CFG2). In addition, the arrangement of the optical lens, such as of the exemplary optical lens depicted in FIGS. 1 and 2, may allow the user to exert pressure on the moveable element (300) to compress the first cavity (401) and push the first fluid back to the first fluid tank (701), thus switching the optical equipment from the second configuration (CFG2) back to the first configuration (CFG1).

The fluid supply element may further comprise a second fluid tank (702). In the first and second configurations (CFG2) of the optical equipment, the second fluid tank is filled with at least a predetermined amount of a second fluid chosen to alter the propagation of visible light differently than the first fluid.

The fluid supply element may further comprise a number of additional fluid tanks which is only limited by capacity requirements.

Some examples of volumes and of dimensions of tanks are disclosed hereafter.

With a cavity 50 µm thick extending all over the surface of an optical lens having a 70 mm diameter, the volume of fluid needed is 0.19 mL. This volume can fill a tank tube, or cylindrical cartridge placed in an arm of a spectacle frame, having 2.8×30 mm dimensions or a spherical tank placed inside the moveable element and having a 75 µm radius. The force and power needed to move the fluid in the tank are, respectively, 321 mN and 9.6 mW.

With a cavity 50 µm thick extending all over the surface of an optical lens having a 35 mm diameter, the volume of fluid needed is 0.05 mL. This volume can fill a tank tube, or a cylindrical cartridge, having 1.4×30 mm dimensions. The force and power needed to move the fluid in the cartridge are, respectively, 80 mN and 2.4 mW.

With a cavity 20 µm thick extending all over the surface of an optical lens having a 70 mm diameter, the volume of fluid needed is 0.07 mL. This volume can fill a tank tube, or a cylindrical cartridge, having 1.8×30 mm dimensions or a spherical tank placed inside the moveable element and having a 47 µm radius. The force and power needed to move the fluid in the cartridge are, respectively, 128 mN and 3.85 mW.

With a cavity 20 µm thick extending all over the surface of an optical lens having a 35 mm diameter, the volume of fluid needed is 0.02 mL. This volume can fill a tank tube, or cylindrical cartridge, having 0.9×30 mm dimensions. The force and power needed to move the fluid in the cartridge are, respectively, 32 mN and 0.96 mW.

The fluid supply element may further comprise a selector (800) configured to selectively couple the fluid inlet (500) with the first fluid tank (701) or with the second fluid tank (702).

The fluid supply element may further be switchable between the first configuration (CFG1) and a third configuration, wherein in the third configuration, the first sealed cavity (401) is filled with a predetermined amount of the second fluid, and the moveable element (300) is held in the second position by the pressure exerted by the second fluid in the first sealed cavity (401).

The invention claimed is:

1. An optical article comprising:
   an optical lens shell having an internal surface and an external surface, wherein:
   the optical article further comprises a support element mounting the optical lens shell, disposed in a fixed position, and movably mounting a moveable element between a first position and a second position, wherein in the first position the moveable element is against the optical lens shell, wherein in the second position the moveable element is released from the optical lens shell,
   the optical article further comprises a first sealed cavity, placed between the moveable element and the internal surface of the optical lens shell, coupled to a fluid inlet adapted for adjusting an amount of fluid in the first sealed cavity,
   the optical article is switchable between a first configuration and a second configuration,
   in the first configuration, the moveable element is passively held in the first position, and
   in the second configuration, the first sealed cavity is filled with a predetermined amount of a first fluid altering propagation of visible light and the moveable element is held in the second position by pressure exerted by the first fluid in the first sealed cavity,
   wherein the optical article is switchable between the first configuration and a third configuration,
   wherein in the third configuration, the first sealed cavity is filled with a predetermined amount of a second fluid, and the moveable element is held in the second position by the pressure exerted by the second fluid in the first sealed cavity, and
   wherein the second fluid alters the propagation of visible light differently than the first fluid.

2. The optical article according to claim 1, wherein the moveable element is a rigid element having an external surface and an internal surface.

3. The optical article according to claim 2, wherein the first sealed cavity is defined by the internal surface of the rigid element and the internal surface of the optical lens shell.

4. The optical article according to claim 2, wherein:
   the optical article comprises, attached on the internal surface of the rigid element, a deformable membrane which is held against the internal surface of the optical lens shell in the first and second configurations, and
   the first sealed cavity being defined by the deformable membrane and the internal surface of the rigid element.

5. The optical article according to claim 1, wherein the moveable element is a deformable membrane, the first sealed cavity being defined by the deformable membrane and the internal surface of the optical lens shell.

6. The optical article according to claim 5, further comprising a rigid element, having an internal surface and an external surface, mounted on the support element, disposed in a fixed position.

7. The optical article according to claim 6, wherein:
   a second sealed cavity is defined by the membrane and the internal surface of the rigid element,
   at least in the second configuration, the second sealed cavity is filled with a predetermined amount of a counter-pressuring fluid, exerting on the membrane a counter-pressure which opposes the pressure exerted by the first fluid in the first sealed cavity, and
   the membrane has a non-uniform thickness.

8. The optical article according to claim 7, wherein one of the first fluid, the counter-pressuring fluid and the membrane filters at least part of the visible light spectrum so that in the second configuration, the optical article has a non-uniform transmission function.

9. The optical article according to claim 8, wherein one of the first fluid, the counter-pressuring fluid and the membrane is tinted so that in the second configuration, the optical article has a non-uniform tint.

10. The optical article according to claim 8, wherein the first fluid and the counter-pressuring fluid have substantially different refractive indices so that in the second configuration, the optical article has a non-uniform dioptric function.

11. The optical article according to claim 7, wherein one of the first fluid, the counter-pressuring fluid and the membrane is tinted so that in the second configuration, the optical article has a non-uniform tint.

12. The optical article according to claim 11, wherein the first fluid and the counter-pressuring fluid have substantially different refractive indices so that in the second configuration, the optical article has a non-uniform dioptric function.

13. The optical article according to claim 7, wherein the first fluid and the counter-pressuring fluid have substantially different refractive indices so that in the second configuration, the optical article has a non-uniform dioptric function.

14. The optical article according to claim 1, wherein the fluid inlet is coupled to a controllable element for switching the optical article from the first configuration to the second configuration by moving a predetermined amount of the first fluid from a first fluid tank to the first sealed cavity and/or from the second configuration to the first configuration by moving the predetermined amount of the first fluid from the first sealed cavity to the first fluid tank.

15. The optical article according to claim 1, further comprising:
a selector configured to selectively couple the fluid inlet with a first fluid tank containing the predetermined amount of the first fluid or with a second fluid tank containing the predetermined amount of the second fluid.

16. The optical article according to claim 1, wherein in the first configuration, the pressure inside the first sealed cavity is set to a value below ambient pressure.

17. A method for controlling an optical article including an optical lens shell having an internal surface and an external surface, a support element mounting the optical lens shell, disposed in a fixed position, and movably mounting a moveable element between a first position and a second position, wherein in the first position the moveable element is against the optical lens shell, wherein in the second position the moveable element is released from the optical lens shell, a first sealed cavity, placed between the moveable element and the internal surface of the optical lens shell, coupled to a fluid inlet adapted for adjusting an amount of fluid in the first sealed cavity, the method comprising:
switching the optical article between a first configuration and a second configuration,
wherein
in the first configuration, the moveable element is passively held in the first position, and
in the second configuration, the first sealed cavity is filled with a predetermined amount of a first fluid altering a propagation of visible light and the moveable element is held in the second position by pressure exerted by the first fluid in the first sealed cavity,
wherein the optical article is switchable between the first configuration and a third configuration,
wherein in the third configuration, the first sealed cavity is filled with a predetermined amount of a second fluid, and the moveable element is held in the second position by the pressure exerted by the second fluid in the first sealed cavity, and
wherein the second fluid alters the propagation of visible light differently than the first fluid.

18. The method according to claim 17, wherein:
the optical article further comprises a selector configured to selectively couple the fluid inlet with a first fluid tank containing the predetermined amount of the first fluid or with a second fluid tank containing a predetermined amount of a second fluid which alters the propagation of visible light differently than the first fluid,
the method further comprises switching the optical article between the first configuration and a third configuration, and
in the third configuration, the first sealed cavity is filled with the predetermined amount of the second fluid, and the moveable element is held in the second position by the pressure exerted by the second fluid in the first sealed cavity.

* * * * *